Nov. 26, 1968 HISAO MAEDA 3,413,621
MAGNETIC STORAGE ELEMENT HAVING CONSTANT FLUX DISTRIBUTION
Filed March 31, 1965 4 Sheets-Sheet 1

INVENTOR
HISAO MAEDA
BY
H. Edward Mesters

INVENTOR
HISAO MAEDA
BY
H. Edward Mestern

Nov. 26, 1968 HISAO MAEDA 3,413,621

MAGNETIC STORAGE ELEMENT HAVING CONSTANT FLUX DISTRIBUTION

Filed March 31, 1965 4 Sheets-Sheet 3

INVENTOR
HISAO MAEDA
BY
H. Edward Mestern

Nov. 26, 1968 HISAO MAEDA 3,413,621

MAGNETIC STORAGE ELEMENT HAVING CONSTANT FLUX DISTRIBUTION

Filed March 31, 1965 4 Sheets-Sheet 4

INVENTOR
HISAO MAEDA
BY
H. Edward Masters

United States Patent Office 3,413,621

Patented Nov. 26, 1968

3,413,621

MAGNETIC STORAGE ELEMENT HAVING CONSTANT FLUX DISTRIBUTION

Hisao Maeda, Ota-ku, Tokyo-to, Japan; Hisaaki Maeda, heir of said Hisao Maeda, deceased Filed Mar. 31, 1965, Ser. No. 444,124

Claims priority, application Japan, Apr. 9, 1964, 39/19,958

2 Claims. (Cl. 340—174)

This invention relates to magnetic memory devices and more particularly to improvements in and relating to magnetic memory devices of the matrix type formed by weaving into a fabric structure information lines (weft members) each having a magnetic thin film and word drive lines (warp members, hereinafter referred to as "word lines") in crossed disposition relative to the information lines.

Briefly stated, the present invention resides in the composition and arrangement of a magnetic memory device of the type referred to above, wherein a main line of each word line is formed from a plurality of serially connected unit coils each consisting of two adjacent warp members, said coils being spaced apart by warp spacer wire interposed therebetween, and auxiliary lines consisting of warp members positioned on the two end sides of each main line and supplied with currents for producing a negative magnetic flux distribution with respect to the main line.

The above stated main line and auxiliary lines of the above stated arrangement are provided for the purpose of producing a desirable magnetic flux distribution curve of the main line as will be described in detail hereinafter.

In another form of the device according to the invention, auxiliary coils are further provided, each auxiliary coil being interposed in each space between adjacent coils of each main line and supplied with an auxiliary current of extremely low value in comparison with, but of the same direction as, the current through the main line.

The nature, principles, and details of the invention will be more clearly apparent from the following detailed description when taken in conjunction with the accompanying drawings in which like parts are designated by like reference characters and numerals, and in which.

Figure 3:
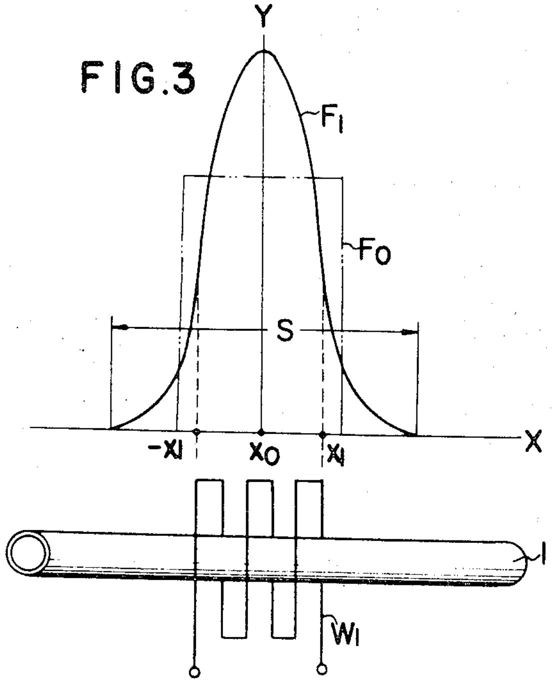
Figure 4:
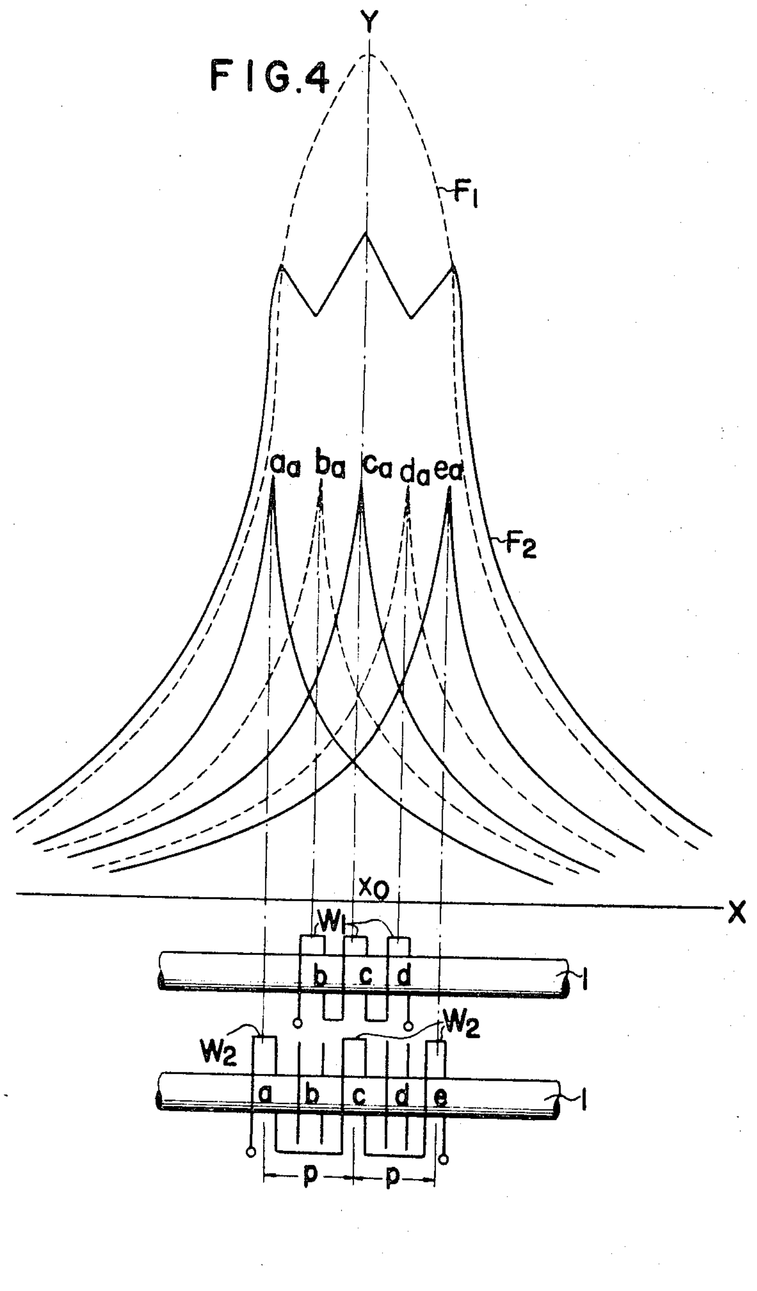
Figure 5:
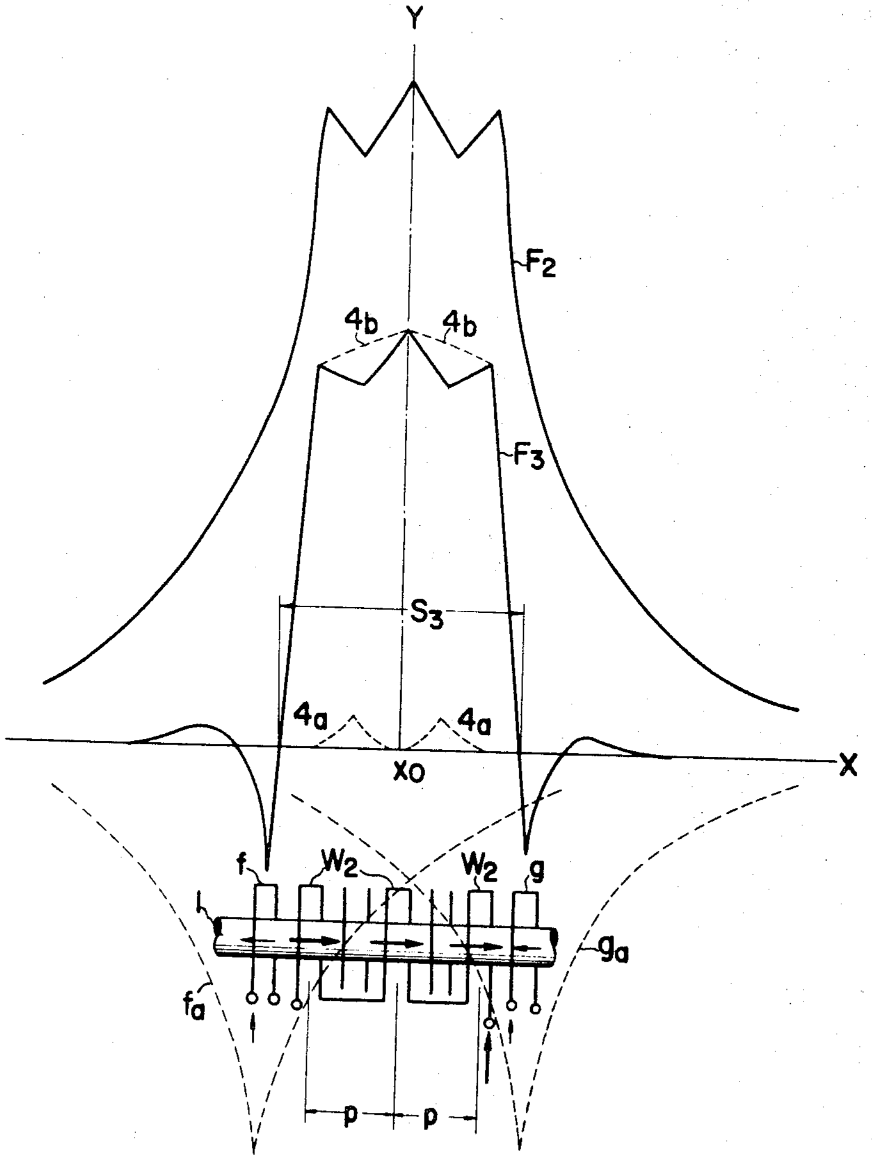
Figure 6:
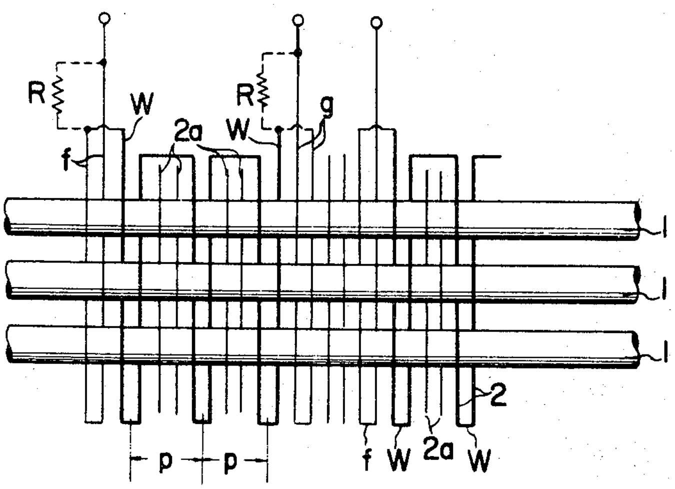
Figure 7:
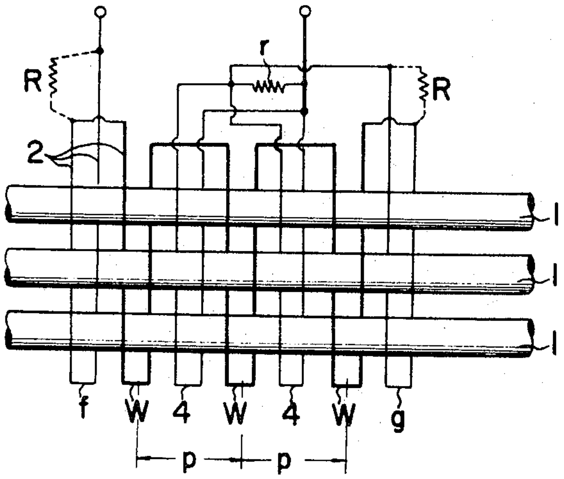

FIGS. 3, 4, and 5 are diagrams indicating magnetic flux distributions for a description of the present invention; and FIGS. 6 and 7 are schematic diagrams showing preferred embodiments of the invention.

Figure 1:
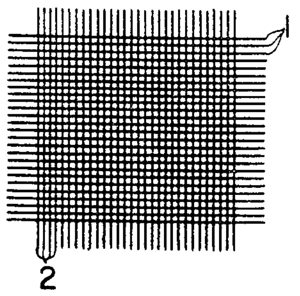
FIG. 1 is a planar view showing the woven state of information lines and word lines.

A memory device of the type referred to above comprises, as shown in FIG. 1, numerous lengths of wire 1 covered with magnetic thin film (hereinafter referred to as "magnetic wire") each consisting of a conductor core wire about which a magnetic thin film of a material such as permalloy is deposited with its easy axis in the circumferential direction by a method such as plating, said length of magnetic wire constituting information lines, and numerous lengths of conductor wire 2 insulated from each other and woven with the information lines to cross the information lines in the form of a fabric structure.

In the fabric structure of the above construction, a digit current is passed through the magnetic wire 1, and a word current for the write-in is passed through a word line to store a memory information consisting of "1" or "0" in the magnetic thin film at the crossing point of the two lines. When the stored information is to be read out, a read-out word current is passed through the word line to cause an output voltage to be generated in the magnetic wire 1.

It is necessary, of course, to insulate the lengths of horizontal wire (wefts) and vertical wire (warps) from each other. Moreover, it is also possible to interweave spacer wire between the lengths of warp wire and weft wire. Alternatively, it is possible to weave the fabric from only magnetic wire 1 and conductor wire 2 and to use only wire lengths at certain suitable intervals as information lines and word lines, the remaining lengths of wire being retained as spacers.

Figure 2:
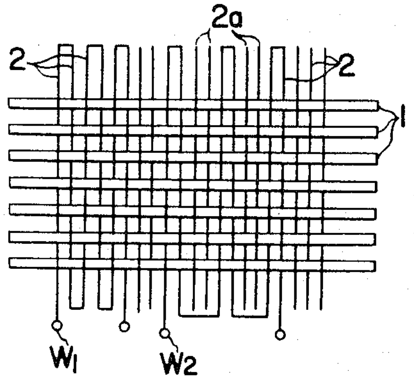
FIG. 2 is an enlarged planar view showing the arrangement of word lines in one part of the fabric structure shown in FIG. 1.

In the examples of word line arrangements shown in FIG. 2, a known arrangement is illustrated by a word line $W_1$ consisting of a conductor wire 2 woven as a warp and formed as a three-turn coil by joining six consecutive warp lengths of conductor wire 2. One embodiment of this invention is illustrated by word line $W_2$ comprising three one-turn coils connected together, each one-turn coil consisting of two adjacent warp lengths of a conductor wire 2, and two length of spacer wire $2_a$ (or conductor wire 2) placed between adjacent coils at space intervals equal to those of the coil conductor wire lengths.

When a current is passed through the word line $W_1$ shown in FIG. 2, the resulting magnetic flux distribution over one length of the magnetic wire is as indicated by curve $F_1$ in FIG. 3, in which the abscissa ($x$ axis) represents distance in the longitudinal direction of the magnetic wire 1, and the ordinate (Y axis) represents the magnetic flux density (magnetic induction). As is apparent from this distribution, the magnetic flux density has a maximum value at the midpoint ($x_0$) of the word line $W_1$ and rapidly decreases as the distance increases positively and negatively from $x_0$.

When information is stored with a magnetic flux distribution of this nature, a word current which is of suitable magnitude with respect to the midpoint $x_0$ may in some cases be too low at points $x_1$ and $-x_1$ at a distance from $x_0$, whereby the flux density at these points is insufficient for information storage operation. Conversely, a word current which is suitable with respect to points $x_1$ and $-x_1$ may give rise to a magnetic flux density at the midpoint $x_0$ which is excessively high.

In the case of destructive read-out, such a magnetic flux distribution is satisfactory, but in the case of non-destructive readout, wherein information content which has once been written in is to be repeatedly read out any number of times without its being destroyed, such a magnetic flux distribution is unsuitable. The reason for this is that, if the word current for read-out is of a magnitude suitable for the midpoint $x_0$, it will be ineffective in the regions of points $x_1$ and $-x_1$, and if it is of a magnitude suitable for points $x_1$ and $-x_1$, it will be excessively high for the midpoint $x_0$, whereby the written-in information content will be destroyed.

For this reason, the ideal shape for the magnetic flux distribution curve is one which approaches as closely as possible a rectangle as indicated by the intermittent (two dat and dash) line $F_0$. For attaining such a curve, it is necessary:

(a) To flatten the peak part of the curve $F_1$, and (b) To increase the positive and negative slopes on the left and right sides, respectively, of the curve, thereby to cause the width of the peak part and the width S of the skirt part to approach each other. It is a specific object of the present invention to attain such a distribution curve.

In general, the rising (and falling) part of a magnetic flux distribution curve becomes steeper as the thickness of the magnetic film on the magnetic wire 1 decreases. However, since this entails a narrowing of the width of the peak part, the above stated object cannot be achieved by merely decreasing the thickness of the magnetic thin film.

Although having a close relationship to the thickness of the magnetic thin film, the spacing of the coils of the word line becomes a major problem in satisfying the above stated condition (a). This problem will now be considered with respect to experimental results indicated in FIG. 4.

FIG. 4 indicates a comparison between the magnetic flux distributions resulting in the following two cases. In both cases, the magnetic wire 1 as shown in FIG. 2 consisted of a Phosphor bronze wire of 0.2 mm. diameter electroplated with a magnetic alloy of 80 percent of nickel and 20 percent iron deposited to a thickness of approximately 2 microns. Nine lengths of this magnetic wire were woven with warps consisting of formal insulated conductor wire of 0.07 mm. diameter spaced at intervals of approximately 1/12 mm. in the one case, six consecutively adjacent lengths of this conductor wire were connected as indicated by $W_1$ in FIG. 2 to form three turns of adjacent coils *b*, *c*, and *d*. In the other case, two lengths of the conductor wire (wire lengths corresponding to *b* and *d* of $W_1$) were skipped over (left unconnected) in forming interconnected coils *a*, *c*, and *e* as indicated by $W_2$ in FIG. 2.

In FIG. 4, the curves designated as $a_a$, $b_a$, $c_a$, etc., indicate the magnetic flux distributions due to unit coils *a*, *b*. *c*, etc., taken individually, and the total magnetic flux distribution curve $F_1$ of $W_1$ indicates the curve resulting from totaling the distribution curves $b_a$, $c_a$, and $d_a$. The total flux distribution curve $F_2$ of $W_2$ indicates the curve resulting from totaling the distribution curves $a_a$, $c_a$, and $e_a$.

From these results, it is apparent that, when a coil spacing *p* is provided as in the case of $W_2$, the magnetic flux density of the midpoint becomes low, but the peak part of the flux distribution curve $F_2$ is improved, approaching a flat shape, whereby the aforestated condition (a) can be satisified.

The provision of a spacing *p* in this manner by means of spacer wire between the coils of the word line, with suitable interrelation to the thickness of the magnetic thin film on the magnetic wire, constitutes one important feature of the present invention.

Of course, if the device is woven with warp spacing suitably provided beforehand for the coil spacing *p*, spacer wire for maintaining the coil spacing will not be necessary. However, if spacer wire is used, it will be difficult to maintain accurately and positively the coil spacing *p*, and, moreover, there will arise difficulties such as the spreading of the spacing between two lengths of adjacent wire lengths forming each one-turn coil, irregularity of said spacing, and the necessity of using irregular spacing of the warp wire lengths at the time of weaving.

Next, in order to satisfy the aforestated condition (b), the present invention provides, as another important feature thereof, an arrangement as indicated in FIG. 5 wherein auxiliary lines *f* and *g* are formed by conductor wire lengths disposed near both sides of the word line $W_2$, and a current of opposite direction relative to the current flowing through the word line $W_2$ and, moreover, of small ampere-turns is passed through each of these auxiliary lines.

By this arrangement, the currents flowing through the auxiliary lines *f* and *g* cause negative magnetic flux distributions as indicated by dotted-line curves $f_a$ and $g_a$ to be algebraically combined with the curve $F_2$, thereby to produce an approximately rectangular curve $F_3$ of narrow skirt width and extremely steep rising and falling sides.

The positions and the magnitudes of the currents of the auxiliary lines *f* and *g* are, of course, also determined to have suitable relationship to conditions such as the thickness of the magnetic thin film and the coil spacing *p* of the word line $W_2$. The number of coil turns of the auxiliary lines can also be suitably selected.

In one preferred embodiment of the invention as shown in FIG. 6, the main line W of a word line forming three coil turns is provided between each pair of adjacent coils with two lengths of spacer wire $\mathbf{2}_a$ to maintain the coil spacings. The main line W is further provided at its two sides with auxiliary lines *f* and *g* each of one turn which are connected to the main line W and supplied with currents of directions opposite that of the main line W on the same side of the magnetic wire 1.

The positions of the auxiliary lines, of course, can be suitably selected by interposing spacer wire also between the main line and the auxiliary lines. Furthermore, in order to adjust the current flowing through the auxiliary lines, it is also possible to resort to a method such as connecting a resistance R or a thin resistance wire in parallel with each auxiliary line.

In a modified embodiment of the invention as shown in FIG. 7, the peaks and valleys at the top part of the curve $F_3$ shown in FIG. 5 are further leveled. For this purpose, auxiliary coils 4 are formed at positions corresponding to this top part of the curve and supplied with low auxiliary current such as to produce magnetic flux distribution curves $\mathbf{4}_a$ as shown in FIG. 5, thereby to fill the concave parts of the top part of curve $F_3$ and produce resultant curves as designated by $\mathbf{4}_b$.

For these auxiliary coils 4, the spacer wire between the main line W may be utilized, or thin wire of high resistance may be interwoven into the fabric structure. In order to cause the current through each auxiliary coil 4 to become low, it is possible to connect in parallel thereto a resistance *r* (or a resistance wire).

Thus, by the practice of the present invention in the above described manner, the magnetic flux distribution due to the word current over the magnetic wire can be caused to assume a state which is close to that of a rectangular distribution as indicated by curve $F_3$ in FIG. 5. Accordingly, almost all of the flux in interval $S_3$ can be uniformly utilized, whereby an extremely efficient memory device of high output can be provided. Such a memory device is highly suitable for non-destructive read-out systems.

For a destructive read-out system, also, since the skirt width $S_3$ of one bit becomes narrow in the device of the invention, the mutual interference between neighboring bits is reduced, whereby the bit density can be greatly increased.

It should be understood, of course, that the foregoing disclosure relates to only preferred embodiments of the invention and that it is intended to cover all changes and modifications of the examples of the invention herein chosen for the purposes of the disclosure, which do not constitute departures from the spirit and scope of the invention as set forth in the appended claims.

What I claim is:

1 In a magnetic memory device of the type formed by weaving into a fabric structure numerous lengths of conductor wire covered with magnetic thin film used as information lines and having magnetic easy axes in the circumferential direction as weft members and numerous lengths of conductor wire constituting word lines as warp members, the combination and arrangement comprising a main line of each word line formed from a plurality of serially connected unit coils each consisting of two adjacent warp members, said coils being spaced apart by warp spacer wire interposed therebetween, said main line being provided for the purpose of flattening the top part of the curve of magnetic flux distribution over the conductor wire covered with magnetic thin film due to current flowing through each word line, and auxiliary lines consisting of warp members positioned on the two end sides of each main line and supplied with curernts for producing a negative magnetic flux distribution with respect to the main line, said auxiliary lines being provided for the purpose of causing the slopes of the skirt parts of said magnetic flux distribution curve of the main line to become steep.

2. In a magnetic memory device of the type formed by weaving into a fabric structure numerous lengths of conductor wire covered with magnetic thin film used as information lines and having magnetic easy axes in the circumferential direction as weft members and numerous lengths of conductor wire constituting word lines as warp members, the combination and arrangement comprising a main line of each word line formed from a plurality of serially connected unit coils each consisting of two adjacent warp members; said coil being spaced apart by warp spacer wire interposed therebetween, said main line being provided for the purpose of flattening the top part of the curve of magnetic flux distribution over the conductor wire covered with magnetic thin film due to current flowing through each word line, auxiliary lines consisting of warp members positioned on the two end sides of each main line and supplied with currents for producing a negative magnetic flux distribution with respect to the main line, said auxiliary lines being provided for the purpose of causing the slopes of the skirt parts of said magnetic flux distribution curve of the main line to become steep, and an auxiliary coil interposed in each space of distance *p* between adjacent coils of each main line and supplied with an auxiliary current of extremely low value in comparison with, but of the same direction as, the current through the main line.

References Cited

UNITED STATES PATENTS

| | | | |
|---|---|---|---|
| 3,011,158 | 11/1961 | Rogers | 340—174 |
| 3,154,769 | 10/1964 | Blades | 340—174 |
| 3,221,312 | 11/1965 | MacLachlan | 340—174 |
| 3,239,822 | 3/1966 | Davis et al. | 340—174 |
| 3,241,127 | 3/1966 | Snyder | 340—174 |
| 3,286,242 | 11/1966 | Gianola | 340—174 |
| 3,300,767 | 1/1967 | Davis et al. | 340—174 |
| 3,309,681 | 3/1967 | Boles et al. | 340—174 |
| 3,366,938 | 1/1968 | Matsushita | 340—174 |

STANLEY M. URYNOWICZ, Jr., *Primary Examiner.*